United States Patent [19]

Nisser et al.

[11] 3,941,634

[45] Mar. 2, 1976

[54] METHOD FOR THE PREPARATION OF PAPER CONTAINING PLASTIC PARTICLES

[75] Inventors: Henrik Gustaf Folke Nisser, Falun; Jorgen Petersen; Sten Erik Porrvik, both of Sundsvall, all of Sweden

[73] Assignee: Kemanord Aktiebolag, Stockholm, Sweden

[22] Filed: Oct. 25, 1974

[21] Appl. No.: 518,003

[30] Foreign Application Priority Data

Oct. 26, 1973 Sweden .............................. 7314614

[52] U.S. Cl. ............. 156/79; 162/124; 162/168 R; 162/168 N; 260/2.5 B; 264/45.4; 264/46.3; 264/53; 264/109; 264/321; 428/314

[51] Int. Cl.$^2$ ............................................ B32B 5/20

[58] Field of Search ......... 260/2.5 B; 264/109, 45.4, 264/46.3, 51, 53, 321; 156/79; 161/DIG. 5; 162/101, 124, 168 R, 168 N

[56] References Cited

UNITED STATES PATENTS

| | | | |
|---|---|---|---|
| 2,962,407 | 11/1960 | Aykanian ............................ | 264/45.4 |
| 3,116,349 | 12/1963 | Immel ................................ | 264/45.4 |
| 3,144,492 | 8/1964 | Lightner et al. .................... | 264/45.4 |
| 3,773,876 | 11/1973 | Rath et al. .......................... | 264/45.4 |

*Primary Examiner*—Edward G. Whitby
*Attorney, Agent, or Firm*—Fred Philpitt

[57] ABSTRACT

Forming a plastic containing paper product by introducing expandable plastic pellets between two partially dewatered webs of cellulose fibers, pressing together and heating.

8 Claims, No Drawings

METHOD FOR THE PREPARATION OF PAPER CONTAINING PLASTIC PARTICLES

BACKGROUND

It is previously known to prepare paper containing plastic particles in order to obtain a paper product having a light weight but with the service properties of heavier paper. For instance Swedish Patent 300,927 describes a process wherein expanded plastic beads are added to a fiber pulp before the pulp is dewatered over a wire screen, whereafter the paper is formed in a known manner. This method is not entirely satisfactory since there will be difficulties in achieving sufficient retention between the cellulose fibers and in achieving a good enough dispersion of the plastic beads in the pulp to obtain a uniform paper. Such paper will often exhibit a pronounced two-sidedness, since the polymer particles to a great extent will be present on the side of the paper that is furthest from the wire. Furthermore, the surface of the finished paper frequently contains bubbles or foam particles from the plastic, which cause disturbances if they are too large or if they come off the surface. To obtain acceptable paper by this known process some sort of surface sizing must be carried out, which increases the price of the finished paper.

Several methods have also been suggested for the preparation of laminated paper, wherein a middle-layer is made up from an expanded plastic. These methods utilize two or more finished paper sheets between which a layer of expandable or expanded plastic is laminated. According to one method a film of an expandable plastic is introduced beween the paper sheets and the laminate is then bonded by heating and calendering. It has also been suggested to prepare a laminate by introduction of expanded plastic beads between two paper sheets having an adhesive coating so that the finished laminate will have a layer of expanded plastic glued to the paper. Furthermore, it is known to introduce a water or solvent dispersion of an expandable plastic between two paper sheets and obtain a paper laminate by drying and heating. These lamination methods start with pre-fabricated paper sheets which are subjected to some kind of subsequent treatment, such as heating or drying, in order to obtain a paper containing plastic particles. This subsequent treatment naturally increases the production price and the obtained laminate will show two spaced apart paper layers bonded together by the plastic layer. In order to obtain a satisfactory z-strength, i.e. bonding between the three layers, the demands on process equipment and process control must be high.

THE INVENTION BROADLY

Considered from one aspect, the present invention involves a method for the preparation of paper containing plastic particles which includes
a. forming two spaced apart partially dewatered webs of cellulose fibers,
b. introducing expandable thermoplastic beads between said spaced apart partially dewatered webs of cellulose fibers,
c. pressing said spaced apart partially dewatered webs of cellulose fibers together, and
d. subjecting the product of step (c) to heat so as to at least partially dry said cellulose fibers and so as to cause at least a portion of said plastic beads to expand.

The term "paper" also includes the thicker types of paper which are generally referred to as board or cardboard.

The partially dewatered webs of cellulose fibers between which the expandable or partly expanded thermoplastic beads are to be introduced, have a dry content within the range of from about 8 to 20 percent by weight, and preferably about 10 to 15 percent by weight, i.e. the water content of the wet web on the wire of a conventional paper machine. They are prepared in a known manner by the slurrying of cellulose fibers in water and depositing these on a wire support. The slurry of fibers in water or the pulp can contain conventional paper making additives such as alum, fillers, retention agents, wet strength agents, anti-foaming agents, fungicides, etc. The type of fiber does not influence the finished laminate and all types of fibers can be used when carrying out the process.

The expandable thermoplastic particles deposited between the two cellulose webs may be either unexpanded or partly expanded.

As examples of expandable polymer beads suitable for the production of paper according to the present method can be mentioned polymethylmethacrylate or copolymers of methylmethacrylate and monomers copolymerizable therewith, whereby the amount of methylmethacrylate should exceed 70 percent by weight based on the copolymer; copolymers of acrylonitrile and vinylidene chloride containing 10 to 90 percent by weight of acrylonitrile based on the copolymer; and polystyrene or copolymers of styrene and monomers copolymerizable therewith, whereby the amount of styrene should exceed 70 percent by weight based on the copolymer. A preferred copolymer of styrene is styrene-acrylonitrile copolymer wherein the amount of styrene exceeds 70 percent by weight based on the copolymer.

According to one preferred embodiment of the invention plastic beads of polystyrene or copolymers containing at least 70 percent by weight of styrene, especially styreneacrylonitrile copolymer, are selected for economical reasons. If the particle size of such polystyrene beads is very small it has been found that the blowing agent has a certain tendency to diffuse through the shell of the bead, which problem is avoided if the plastic beads are kept dispersed in water and thus applied wet.

According to an alternative embodiment of the invention the plastic dispersion can also contain cellulose fibers and conventional papermaking additives such as retention agents, wet strength agents, anti-foaming agents, fillers etc. The weight ratio of plastic beads to cellulose fibers in such a dispersion should be within the range of from 1:20 to 20:1.

The quantity of plastic beads incorporated in the paper according to the present invention can be varied within wide limits. Preferably about 0.05 to 60 percent by weight of plastic particles based on dry fibers are incorporated in the finished paper. When making writing paper which has a relatively light weight, the quantity of plastic particles should be within the range of from about 5 to 20 percent by weight of polymer based on dry fibers. In cardboard production the amount of plastic particles should be within the range of from about 2 to 15 parts by weight of polymer based on dry fibers, while when making cardboard (where heat insulating properties are desired) an amount of polymer within the range of from about 25 to 50 percent by weight based on dry fibers can be used.

The particle size of the polymer beads in unexpanded form is determined both by the polymer type used and by the thickness of the wet webs and the coarseness of the cellulose fibers. Generally the unexpanded polymer particles should have a diameter of from 0.5 to 200 $\mu$m. For the production of paper the particles should have a diameter of from 0.5 to 100 $\mu$m, preferably from 3 to 60 $\mu$m. For the production of cardboard a particle diameter of from 60 to 200 $\mu$m is preferred. A preexpansion of the beads before introduction between the wet webs can be suitable.

The expandable plastic beads can be introduced between the two wet webs either in dry form or in wet form. If dry application of the polymer is selected the distribution of the plastic beads between the wet webs must be carefully regulated in order to avoid over-dosage with subsequent lump formation. As examples of suitable application forms can be mentioned pneumatic deposition or screening. With these types of dry application a certain sorting out of coarse and fine fractions of the polymer beads will simultaneously be obtained and thus the demand for uniform particle size of the polymer will be reduced. With wet application of the polymer beads a dispersion of the beads in water or other inert dispersing medium is suitably used. The particle size range of the thus dispersed polymer should be kept rather narrow to avoid too great variations in the finished product. The dry content of the dispersion is dependent on the amount of plastic beads desired in the finished paper and should normally be within the range of from 0.05 to 40 percent by weight based on the dispersion.

The process according to the present invention is suitably carried out on a paper machine having a double wire screen or on any paper machine having at least two wire screens. The unexpanded or partly expanded plastic particles are applied to the wet web of cellulose fibers on the first wire screen and the second wet web of cellulose fibers is then superposed thereon during dewatering. When the laminate leaves the wire the webs are couched together with the intermediate plastic layer and the product is brought to the pressing and drying section of the paper machine.

During the drying the polymer beads will expand when the temperature of the material rises above about 75°C, i.e. the temperature in the drying section of a conventional paper machine. This temperature will naturally vary somewhat depending on the chosen polymer type and on the thickness of the laminate. Upon the expansion of the plastic beads the surface of the beads will soften and thus a bond between the plastic and the cellulose fibers is obtained which gives an improved z-strength of the laminate. If so desired the obtained paper can be smoothed. It should be noted that the paper should not be subjected to pressures high enough to cause the expanded plastic beads to become too much deformed.

The expandable plastic beads are prepared according to known methods, so that the finished polymerizate comprises beads containing a blowing agent, which is vaporized upon heating, with accompanying expansion of the plastic beads.

The temperature gradient in the drying section is selected as for conventional paper making and when the temperature of the laminate exceeds about 75°C the plastic particles will expand. The final drying should be carried out at a temperature of about 100°C and this temperature varies somewhat depending on the selected polymer, the quantity of particles, the particle size and the thickness of the material. When making writing paper the paper should be calendered to obtain the desired surface.

It is within the scope of the invention to prepare laminates comprising additional layers of cellulose webs and/or additional layers of cellulose and polymer webs.

The advantages of our process are as follows:
1. it produces a uniform paper of good z-strength,
2. it utilizes process equipment that is already available at paper mills,
3. it permits considerable freedom in the choice of the expandable plastic since there are no demands on the retention to the cellulose fibers or on dispersability in the pulp,
4. no subsequent treatment of the product, besides what is customary in paper making, is necessary,
5. the production costs can be kept relatively low,
6. the resulting product has the service properties of a heavier paper, such as stiffness, opacity, etc.

The following example is illustrative of a preferred embodiment of the present invention. It should be understood that this example is not intended to limit the invention and that obvious changes may be made by those skilled in the art without changing the essential characteristics and the basic concept of the invention. The parts and percentages are by weight, the temperature is room temperature and the pressure is atmospheric unless otherwise indicated.

EXAMPLE

On a paper machine equipped with two wire screens located in such a way that the formed fiber webs can be brought together before the couch is made on each wire, two webs of sulfate pulp were formed having a weight of 66 g/m². On the web on the lower wire was then applied before couching a water dispersion containing 18 g/l of expandable polystyrene beads in an amount equivalent to 65 g polystyrene per square meter of sheet. The dispersion water was suctioned off by a suction box placed below the wire, whereafter the upper web was applied. After pressing in the press section the webs with intermediate plastic were dried at a temperature of 90°C in the drying section. The obtained sheet had a weight of 197 g/m². On comparison with a conventional sheet of the same paper making pulp, but without a polystyrene layer the following results were obtained:

| | | | |
|---|---|---|---|
| % Polystyrene | | 30 | 0 |
| Basis weight g/m² | | 197 | 200 |
| Thickness $\mu$m | | 402 | 321 |
| Bulk cm³/g | | 2.0 | 1.6 |
| z-strength kPa | | 410 | 240 |
| Stiffness 10 mmg | Longitudinal | 250 | 204 |
| | Transversal | 165 | 103 |

More or less detailed claims will be presented hereinafter and even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art and still other obvious equivalents could be readily ascertained upon rather simple, routine non-inventive experimentation. Certainly no invention would be involved in substituting one or more of such obvious equivalents for the materials specifically recited in the claims. We intend that all such obvious equivalents be encompassed within the scope of this invention and patent grant in accordance with the wellknown doctrine of equivalents, as well as changed proportions of the ingredients which do not render the composition unsuitable for the disclosed purposes.

We claim:

1. A method for the preparation of a composite that contains plastic particles which includes
   a. forming a first partially dewatered web of cellulose fibers by depositing the fibers from a pulp on a wire support,
   b. depositing on said first web a plurality of expandable plastic beads, said plastic being selected from the group consisting of copolymers of acrylonitrile and vinylidene chloride, polystyrene or copolymers thereof, or polymethylmethacrylate or copolymers thereof, in a quantity equal to between 0.05 and 60% by weight of said plastic particles based on dry cellulose fibers, said unexpanded beads having diameters within the range of 0.5 to 200 μm,
   c. depositing over said beads a partially dewatered second web of cellulose fibers formed by depositing the fibers from a pulp on a wire support so that said beads are disposed between said first and second webs,
   d. pressing said first and second partially dewatered webs together,
   e. subjecting said pressed together webs to a temperature of at least about 75°C so as to effect both a drying of said webs and an expansion of at least a portion of said expandable beads.

2. A method for the preparation of paper containing plastic particles which includes
   a. forming two spaced apart partially dewatered webs of cellulose fibers by depositing the fibers from a pulp on a wire support,
   b. disposing between said dewatered webs of cellulose fibers a plurality of expandable thermoplastic beads,
   c. pressing said spaced apart partially dewatered webs of cellulose fibers together, and
   d. subjecting the product of step (c) to heat so as to at least partially dry said cellulose fibers and so as to cause at least a portion of said plastic beads to expand.

3. The method according to claim 2 characterized in that the partially dewatered webs of cellulose fibers have a dry content within the range of from 8 to 20 percent by weight.

4. The method according to claim 2 characterized in that the expandable plastic beads consist of polystyrene or a styreneacrylonitrile copolymer containing at least 70 percent by weight of styrene based on the copolymer.

5. The method according to claim 2 characterized in that the plastic beads are introduced between the partially dewatered webs of cellulose fibers in the form of a dispersion.

6. The method according to claim 2 characterized in that the plastic beads have a particle size within the range of from 0.5 to 100 μm.

7. The method according to claim 2 characterized in that the plastic beads have a particle size within the range of from 60 to 200 μm.

8. The method according to claim 2 characterized in that the plastic beads are introduced between the partially dewatered webs of cellulose fibers in the form of a dispersion containing cellulose fibers.

* * * * *